United States Patent
Kopp et al.

(10) Patent No.: US 9,671,806 B2
(45) Date of Patent: Jun. 6, 2017

(54) METHOD, A SYSTEM, A SERVER, A CONTROL ELEMENT, A COMPUTER PROGRAM AND A COMPUTER PROGRAM PRODUCT FOR OPERATING A POWER GRID HAVING DECENTRALIZED CONTROL ELEMENTS

(75) Inventors: Dieter Kopp, Illingen (DE); Klaus Stocker, Stuttgart (DE); Wolfgang Templ, Sersheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 424 days.

(21) Appl. No.: 14/234,186

(22) PCT Filed: Jul. 4, 2012

(86) PCT No.: PCT/EP2012/062969
§ 371 (c)(1),
(2), (4) Date: Jan. 22, 2014

(87) PCT Pub. No.: WO2013/017363
PCT Pub. Date: Feb. 7, 2013

(65) Prior Publication Data
US 2014/0156096 A1 Jun. 5, 2014

(30) Foreign Application Priority Data

Aug. 3, 2011 (EP) .................................. 11306009

(51) Int. Cl.
G05B 11/01 (2006.01)
G05D 3/12 (2006.01)
(Continued)

(52) U.S. Cl.
CPC .............. *G05F 1/66* (2013.01); *G06Q 10/06* (2013.01); *Y04S 10/54* (2013.01)

(58) Field of Classification Search
None
See application file for complete search history.

(56) References Cited

U.S. PATENT DOCUMENTS 5,821,757 A * 10/1998 Alvarez ................ H02J 7/0021
320/120
6,167,349 A * 12/2000 Alvarez ............... G01R 31/362
324/430
(Continued)

FOREIGN PATENT DOCUMENTS

EP 1431899 6/2004
EP 1635286 3/2006

OTHER PUBLICATIONS

Jiang, Z. et al; Computational Intelligence Techniques for a Smart Electric Grid of the Future; Advances in Neural Networks—ISNN 2009; Springer Berlin Heidelberg, Berlin, Heidelberg; May 26, 2009; pp. 1191-1201; XP019117077; ISBN: 978-3-642-01506-9.
(Continued)

*Primary Examiner* — Adam Lee
(74) *Attorney, Agent, or Firm* — Patti & Malvone Law Group, LLC

(57) ABSTRACT

An exemplary method and apparatus are provided for operating a power grid that has decentralized control elements. The decentralized control elements are adapted to interact with each other, in particular by communication. At least a part of the power grid, a control element or the interaction between control elements, in particular the communication between control elements, is monitored. When a problem in at least a part of the power grid, the control element or the interaction between control elements, in particular a communication breakdown, is detected, a control element affected by the problem is triggered to work autonomously.

11 Claims, 2 Drawing Sheets

(51) Int. Cl.
*G05F 1/66* (2006.01)
*G06Q 10/06* (2012.01)

(56) References Cited

U.S. PATENT DOCUMENTS

| | | | | |
|---|---|---|---|---|
| 6,321,170 | B1* | 11/2001 | Wurgler | B60L 3/04 246/187 A |
| 7,184,903 | B1* | 2/2007 | Williams | H02J 3/32 702/60 |
| 7,573,891 | B1* | 8/2009 | Chow | H04B 3/542 370/401 |
| 7,659,640 | B1* | 2/2010 | El Houmaidi | H02J 9/06 307/64 |
| 7,957,355 | B1* | 6/2011 | Heiferling | H04W 40/12 370/338 |
| 2002/0044464 | A1* | 4/2002 | Deng | H02J 3/01 363/40 |
| 2002/0072868 | A1 | 6/2002 | Bartone et al. | |
| 2002/0175660 | A1* | 11/2002 | King | H02J 3/30 322/4 |
| 2005/0012395 | A1* | 1/2005 | Eckroad | H02J 3/16 307/44 |
| 2005/0135031 | A1* | 6/2005 | Colby | H02J 3/42 361/78 |
| 2006/0170410 | A1* | 8/2006 | Bjorn | G01R 15/246 324/96 |
| 2006/0176631 | A1* | 8/2006 | Cannon | H02H 1/0061 361/80 |
| 2007/0156813 | A1* | 7/2007 | Galvez | C07K 16/286 709/204 |
| 2007/0164567 | A1* | 7/2007 | Luetze | H02H 7/067 290/44 |
| 2007/0252555 | A1* | 11/2007 | Potempa | G01R 1/06794 320/116 |
| 2008/0175230 | A1* | 7/2008 | Brand | H04L 65/1053 370/352 |
| 2008/0183339 | A1* | 7/2008 | Vaswani | G01D 4/004 700/297 |
| 2008/0186646 | A1* | 8/2008 | Corum | H02J 3/28 361/225 |
| 2009/0009180 | A1* | 1/2009 | Varghai | H02H 3/081 324/521 |
| 2009/0021078 | A1* | 1/2009 | Corhodzic | G06F 1/263 307/67 |
| 2009/0037768 | A1* | 2/2009 | Adams | G06F 1/30 714/14 |
| 2009/0124209 | A1* | 5/2009 | Keselman | H04B 3/54 455/67.13 |
| 2010/0060000 | A1* | 3/2010 | Scholte-Wassink | F03D 7/0272 290/44 |
| 2010/0211669 | A1* | 8/2010 | Dalgas | G06F 9/5027 709/224 |
| 2010/0228405 | A1* | 9/2010 | Morgal | B62H 3/02 701/2 |
| 2010/0253147 | A1* | 10/2010 | Ogg | H02J 9/061 307/65 |
| 2011/0074215 | A1* | 3/2011 | Vartanian | H02J 3/12 307/46 |
| 2011/0077795 | A1* | 3/2011 | Vangilder | G06F 1/206 700/300 |
| 2011/0106321 | A1* | 5/2011 | Cherian | H02J 3/00 700/286 |
| 2011/0119517 | A1* | 5/2011 | Beeco | H04L 41/0677 713/340 |
| 2011/0140911 | A1* | 6/2011 | Pant | H04B 3/546 340/870.02 |
| 2011/0208933 | A1* | 8/2011 | Selfin | G06F 11/108 711/162 |
| 2011/0216562 | A1* | 9/2011 | Gengenbach | H02J 3/18 363/71 |
| 2011/0257801 | A1* | 10/2011 | Kumula | F01D 15/10 700/287 |
| 2011/0276192 | A1* | 11/2011 | Ropp | H02J 3/383 700/293 |
| 2011/0313581 | A1* | 12/2011 | Genc | G05B 23/0248 700/292 |
| 2012/0026865 | A1* | 2/2012 | Fan | H04W 76/02 370/225 |
| 2012/0026908 | A1* | 2/2012 | Tzannes | H04L 41/12 370/252 |
| 2012/0029720 | A1* | 2/2012 | Cherian | H02J 13/00 700/297 |
| 2012/0173035 | A1* | 7/2012 | Abe | H02J 3/00 700/297 |
| 2012/0176088 | A1* | 7/2012 | Lee | H02J 3/383 320/128 |
| 2012/0271470 | A1* | 10/2012 | Flynn | H02J 3/383 700/292 |
| 2012/0324273 | A1* | 12/2012 | Shaffer | H04L 45/02 714/4.12 |
| 2013/0015703 | A1* | 1/2013 | Rouse | H02J 3/38 307/18 |
| 2014/0025217 | A1* | 1/2014 | Jin | H02J 13/0006 700/295 |

OTHER PUBLICATIONS

Wildberger, A. M. Ph.D.; Autonomous Adaptive Agents for Distributed Control of the Electric Power Grid in a Competitive Electric Power Industry; Knowledge-Based Intelligent Electronic Systems, 1997; KES '97 Proceedings; 1997 First International Conference on Adelaide, SA, Australia, May 21-23, 1997, New York, NJ, USA, IEEE, US vol. 1 May 21, 1997; pp. 2-11; XP010242668; DOI: 10.1109/KEY.1997.616845; ISBN: 978-0-7803-3755-8.

* cited by examiner

METHOD, A SYSTEM, A SERVER, A CONTROL ELEMENT, A COMPUTER PROGRAM AND A COMPUTER PROGRAM PRODUCT FOR OPERATING A POWER GRID HAVING DECENTRALIZED CONTROL ELEMENTS

FIELD OF THE INVENTION

The invention relates to method, a system, a server, a control element, a computer program and a computer program product for operating a power grid having decentralized control elements.

BACKGROUND

The current power grid was defined around 50 years ago. Recently smart grid systems were defined adding communication to the existing power grid. In today's power grid, the generation and transmission part is well monitored and controlled. However the power distribution is not monitored as good. Implementations that add communication to all grid elements (station, sub-stations, solar & wind generators) and a central control using supervisory control and data acquisition (well known as SCADA) will not give a resistant control and operation. In fact, unless special measures are taken to ensure proper performance of such smart grids in case of communication disruption the result of such disruptions may be worse than with power grids not using smart grid elements.

SUMMARY

The object of the invention is thus to provide resistant grid for example in case of:
Partial or full communication breakdown,
Lightning strikes affecting the power grid or parts thereof,
Entirely or partially broken supply network,
Electromagnetic discharge (well known as EMD),
Attack by hacker.

The main idea of the invention is to operate a power grid having decentralized control elements, wherein said decentralized control elements are adapted to interact with each other, in particular by communication, wherein at least a part of said power grid, a control element or the interaction between control elements, in particular the communication between the control elements, is monitored, wherein in case a problem in at least a part of said power grid, a control element or the interaction between control elements, in particular a communication breakdown, is detected, a control element affected by the problem, in particular the communication breakdown, works autonomously. This increases fault tolerance of the power grid, hence making the power grid resistant to many kinds of adverse effects.

Advantageously a server monitors the power grid, the control elements or the interaction between the control elements, in particular the communication between the control elements, wherein in case the server detects a problem in the power grid, a control element or the interaction between control elements, in particular a communication breakdown, the server forces a control element affected by the problem, in particular the communication breakdown, to work autonomously. This way information about the power grid is processed at a central point effectively.

Advantageously a control element monitors the power grid, the control elements or the interaction between the control elements, in particular the communication between the control elements, wherein in case the control element detects a problem in the power grid, a control element or the interaction between control elements, in particular a communication breakdown, the control element forces itself when affected by the problem, in particular the communication breakdown, to work autonomously. This way the power grid is resistant to communication problems that would prevent communication between affected control elements and other control elements or a central server.

Advantageously said control element is forced to work autonomously based on a last of a series of snapshots of the overall situation taken regularly by a server or the control element while monitoring, in particular a snapshot of the overall power grid situation, the state of the control elements or the interaction between the control elements taken at the instance or before the problem occurs, in particular at the instance of the communication breakdown, wherein said snapshot results in one or more rule for operating an affected control element. The snapshots provide a good starting point for the autonomous control of the power grid or parts thereof.

Advantageously said control elements are forced to work autonomous based on a predefined rule, in particular a rule determined from a set of predefined rules as most appropriate to overcome the situation and guarantee still an optimal power quality. The predefined rules provide guidance for the execution of the steps required to maintain the power grid stable or return to normal operation. The predefined rules may define the steps required to be executed to that end directly.

Advantageously said power grid is structured hierarchically in power grid levels, in particular a regional higher level and a neighboring lower level, wherein said control elements are adapted to interact with neighboring control elements of the same power grid level and of the next higher or lower power grid level. Different power grid levels are usually used for long haul distribution, regional distribution and local distribution of electrical power. Grouping the control elements in levels accordingly facilitates the monitoring, control and the autonomous work significantly. Hence resistance of the power grid is further improved.

Further developments of the invention can be gathered from dependent claims and the following description.

BRIEF DESCRIPTION OF THE FIGURES

In the following the invention will be explained further making reference to the attached drawings.

DESCRIPTION OF THE EMBODIMENTS

Figure 1:
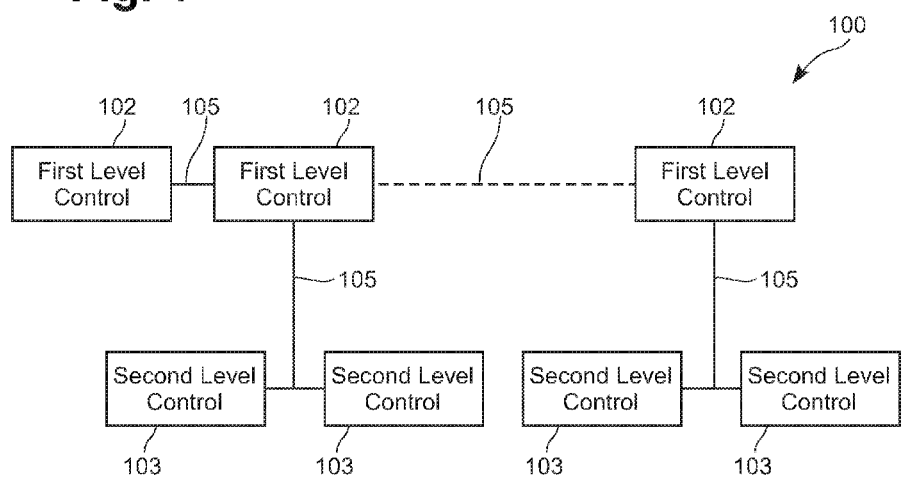
FIG. 1 schematically shows a first part of a power grid.

FIG. 1 schematically shows a first part of a power grid 100 having decentralized control elements 102, 103 that are linked via power lines 105.

Said power grid 100 for example comprises of two levels, a higher first level comprising one or more first level control elements 102 and a second lower level comprising one or more second level control elements 103. Said first level corresponds for example to a regional power transport grid, said second level corresponds for example to a local or neighborhood power transport grid.

According to the example depicted in FIG. 1, said power grid 100 comprises multiple of said first level control elements 102 being connected to each other in a row.

Furthermore said power grid 100 comprises multiple of said second level control elements 103 being connected in pairs to one of said first level control elements 102 respectively.

Additionally in the example of FIG. 1 the leftmost of said first level control elements 102 is not connected to any second level control element 103 but to a power plant (not depicted in FIG. 1) supplying said power grid 100 with electrical power.

Said control elements 102, 103 may be connected differently. For example no hierarchy may be define resulting in said power grid 100 having only one level comprising all of said control elements 102, 103. Furthermore instead of connecting pairs of second level control elements 103 to one first level control element 102 respectively, any other number of second level control elements 103 may be connected to a first level control element 102 or to multiple first level control elements 102.

Furthermore the electrical connection of said first level control elements 102 or said second level control elements 103 may be in parallel or star form instead of in a row.

For example said first level control elements 102 are part of said first level network, e.g. a high voltage transport network adapted to transport electrical power for example at 230 kV.

According to the example said first level control elements 102 are also part of individual of said second level network, e.g. a medium voltage transport network adapted to transport electrical power for example at 50 kV.

In this example said first level control elements 102 comprise for example step down power transformers adapted to transform electrical tension from high voltage to lower voltage e.g. from 230 kV to 50 kV. Said first level control elements 102 may be adapted to transform said electrical tension from any voltage to any other voltage up or down. Said first level control elements 102 may comprise additionally or alternatively any other type of electrical component used in power grids, e.g. a switch or circuit breaker adapted to connect or disconnect parts of said electrical power grid 100.

Said second level control elements 103 are part of said individual second level networks, e.g. said medium voltage transport network. Said second level control elements 103 comprise for example power transformers adapted to transform electrical tension from said medium voltage to a lower voltage, e.g. from 50 kV to 230 V. Said second level control elements 103 may be adapted to transform said electrical tension from any voltage to any other voltage up or down. Said second level control elements 103 may comprise additionally or alternatively any other type of electrical component used in power grids, e.g. a switch or circuit breaker adapted to connect or disconnect parts of said electrical power grid. Said second level control elements 103 may comprise or be part of a station, a sub-station or a solar or wind generator.

According to the example said second level control elements 103 are connected to a low voltage transport network (not depicted in FIG. 1) for example as a main power supply line to one or more houses.

According to the example three phases of alternating current at 50 Hz are used. Other frequencies, like 60 Hz, direct current or more or less phases may be used as well.

Said control elements 102, 103 comprise additionally communication means, for example a network card, adapted to send and receive information via a data link.

Figure 2:
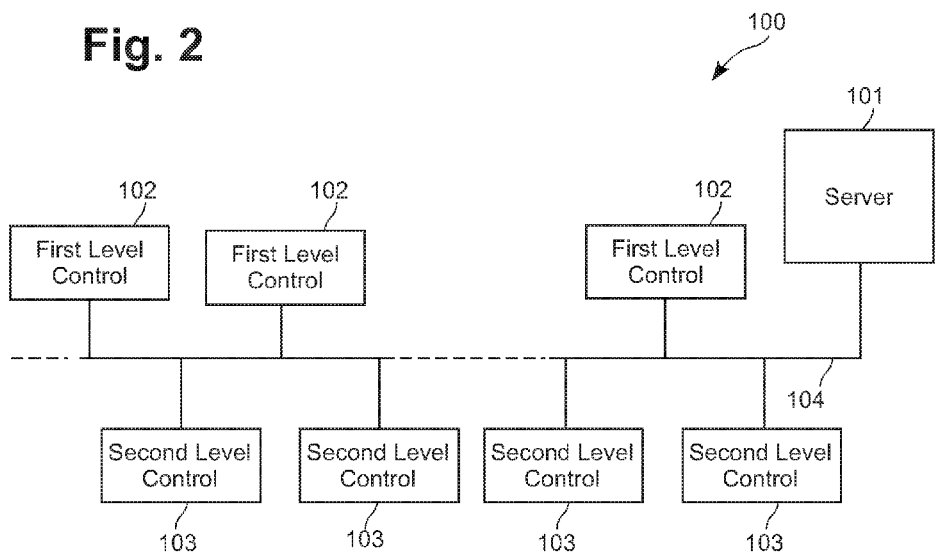
FIG. 2 schematically shows a second part of a power grid.

Said data links are depicted in FIG. 2. According to a first example, said control elements are connected to each other via a data link 104. According to a second example said control elements 102, 103 are connected to each other and to a server 101 via said data link 104.

Both examples are described below making reference to FIG. 2. In the first example, said data link 104 may connect said server 101 or said server 101 may not be used.

According to the first example one of said control elements 102, 103 or each control elements 102, 103 monitors the power grid 100, the control elements 102, 103 or the interaction between the control elements 102, 103, in particular the communication between the control elements 102, 103. Furthermore in case said control element 102, 103 detects a problem in the power grid 100, a control element 102, 103 or the interaction between control elements, in particular a communication breakdown, control element 102, 103 forces itself when affected by the problem, in particular the communication breakdown, to work autonomously.

According to the second example said server 101 monitors the power grid, the control elements or the interaction between the control elements, in particular the communication between the control elements. Furthermore in case said server 101 detects a problem in the power grid 100, a control element or the interaction between control elements, in particular a communication breakdown, to work autonomously.

Said control elements 102, 103 in both examples comprise additionally control means, for example a processor with storage a sensor and an actuator. Said sensor or said actuator may be separate from said control elements 102, 103 connected to them via a separate data link, e.g. a private data bus or wire.

Said control means is adapted to monitor at least a part of said power grid 100, for example by determining values of a characteristic from readings received from said sensor. Said sensor is for example a voltage meter, determining voltage values currently applied to a part of said power grid 100. Said sensor may be an ampere meter or frequency meter as well, measuring amperage or frequency applied to a part of said power grid 100.

Said control means is furthermore adapted to monitor at least a part of said data link 104. For example said control means is adapted to detect packet loss or signal to noise ratio from signals transmitted via parts of said data link 104. To that end for example said communication means, e.g. said network card, is monitored using sensors measuring noise and signal strength or protocols like the transmission control protocol (well known as TCP) to detect packet loss.

Said control means is adapted to detect problems related to the power grid 100 or the communication link 104 depending on the result of the monitoring, e.g. by comparing a target value of the characteristic value with a threshold value. For example said target value is a certain signal to noise ration in dB acceptable for reliable communication. Said target value may be a voltage threshold acceptable for operation of said power grid instead. A target value or two thresholds, e.g. describing an acceptable band, may be used as well. Furthermore deviations from a normal daily load cycle may be used to detect significant deviations.

Said control means is furthermore adapted to control at least a part of said power grid 100. For example said control means is adapted to actuate said actuator to control a part of said power grid 100. Said actuator for example is a switch (not depicted in FIG. 1) adapted to disconnect parts of said low voltage network from the medium voltage network.

Alternatively or additionally controlling said part of said power grid 100 may comprise of activating additional power generators, for example a power plant to supply power to said power grid 100 when needed.

According to both examples said data link 104 is for example a power line communication (well known as PLC). Alternatively said data link 104 may be partially or entirely a local area network (LAN), wireless local area network (WLAN, 802.11n) or wide area network (WAN).

According to both examples Connections are for example according to the well known internet protocol (IP), user datagram protocol (UDP), transmission control protocol (TCP) or stream control transmission protocol (SCTP).

In to both examples the data link 104 or the connection can but must not be directly between the control elements 102, 103 or the server 101. More than one data link 104 may be used, e.g. one data link from said server 101 to each of said control elements 102, 103 or to any number of control elements 102, 103.

According to both examples any of said first level control elements 103 or said second level control elements 103 are adapted to control a part of said power grid 100 decentralized based on interaction with at least one other control element, in particular by communication, and to work autonomously upon detection of a problem in the power grid 100, a control element 102, 103 or the interaction between control elements 102, 103, in particular a communication breakdown.

To that end said first level control elements 102 are adapted to perform regional or first level processing, e.g. one or more of the actions listed in the following non exhaustive list:

First level, e.g. regional, check on first level, e.g. regional, power grid malfunction or critical discontinuity,
Power quality monitoring and control,
Detection of abnormal behavior or singularities,
First level, e.g. regional, demand handling, e.g. balance of first level, e.g. regional, power generation and consumption,
Generation of autonomic conditions and rules for the second level control elements 103 and sending of them to the appropriate second level control elements 103.

Furthermore according to both examples said first level control elements 102 may be adapted to exchange data regarding information about the aforementioned local or first level processing with first level peers, i.e. other first level control elements 102 of the regional network, in particular being directly connected to each other.

Furthermore according to both examples to that end said second level control elements 103 are adapted to perform local or second level processing, e.g. one or more of the actions listed in the following non exhaustive list:

Second level, e.g. local, check on power grid malfunction or critical discontinuity,
Power quality monitoring and control,
Detection of abnormal behavior or singularities,
Second level, e.g. local, demand handling, e.g. balance of local power generation and consumption,
Receiving of autonomic conditions or rules for the second level control elements 103 and control of the second level network according to the autonomic conditions or rules received from the respective first level control elements 102.

Furthermore according to both examples said second level control elements 103 are adapted to exchange data regarding information about the aforementioned local or second level processing with peers in the neighborhood, i.e. other second level control elements 103 of the same local network, in particular being directly connected to each other and to the same first level control element 102.

Furthermore according to said first example said first level control elements 102 or said second level control elements 103 may be adapted to exchange data regarding the respective grid or communication status.

Furthermore according to said second example said first level control elements 102 or said second level control elements 103 are adapted to exchange data regarding the respective grid or communication status with said server 101.

Said data regarding the respective grid or communication status is for example gathered as a first level snapshot and comprises for example the information given in the following non exhaustive list:

Result of the first level or regional check on first level or regional power grid malfunction or critical discontinuity,
Result of power quality monitoring and status of its control,
Result of the detection of abnormal behavior or singularities,
Status of first level or regional demand handling, e.g. balance of first level or regional power generation and consumption,
Currently used autonomic conditions and rules for the second level control elements 103,
Status of the communication with other first level or regional control elements 102 or second level or local control elements 103, e.g. signal to noise ratio or packet loss.

Furthermore according to both examples said first level control elements 102 and said second level control elements 103 are adapted to interact with each other in particular according to the respective automatic conditions or rules. The communication may be between levels or between peer control elements. Such conditions or rules may be target power generation or demand values, switching conditions for switches or the like. Such conditions may be determined by the first level control element 102 for the respective second level control elements 103 based on status information regarding the first level or second level power grid. Said status information may be send by said second level control elements 103 to the respective first level control element 102 via said data link 104. Said status information may be mapped to the appropriate rule using control algorithms for smart grid control. Such control algorithms may determine the target values, e.g. in a closed loop control using the status values.

Furthermore according to both examples said first level control elements 102 are adapted to receive a command to work autonomously. Said command according to said first example is for example a function call or start of a process for working autonomously. According to said second example said command is a message. Said control command may comprise autonomic conditions or rules for the first level control elements 102 or the second level control elements 103 determined based on a second level snapshot of the current power grid situation.

Furthermore according to both examples said second level snapshot comprises the information given in following exemplary and non exhaustive list:

Result of the second level or local check on second level or local power grid malfunction or critical discontinuity,
Result of power quality monitoring and status of its control, Result of the detection of abnormal behavior or singularities, Status of second level or local demand handling, e.g. balance of second level or local power generation and consumption, Currently used autonomic conditions and rules for the second level or local control elements 103, Status of the communication with other first level or regional control elements 102 or second level or local control elements 103, e.g. signal to noise ratio or packet loss.

Said first level snapshot or said second level snapshot according to the first example is gathered by and stored locally on a respective first level control element 102 or second level control element 103.

Furthermore according to both examples said second level control elements 103 are adapted to receive a command to work autonomously. Said command may comprise autonomic conditions or rules for the first level control elements 102 or the second level control elements 103 determined based on a respective of said first level snapshot or second level snapshot of the current power grid situation.

According to the respective example a device, i.e. either said server 101 or said control element 102, 103 is adapted to determine said command to work autonomously. According to said first example, said control element 102, 103 is adapted to determine said command. According to said second example, said server 101 is adapted to determine said command.

Below, said device is described further. Depending on the example, said device is either said server 101 or said control element 102, 103.

Said device may furthermore be adapted to determine said autonomic conditions or rules from said first level snapshot or said second level snapshot.

To that end said device comprises a transmitter, adapted to gather or receive the aforementioned information from said first level control elements 102 or said second level control elements 103 and adapted to send said command, when applicable comprising said conditions or rules.

To that end said device comprises a processor and storage. Said processor may be adapted to determine said first level snapshot or said second level snapshot from information received via said receiver. For example said first level snapshot or said second level snapshot describes the status of relevant individual control elements in an overall situation. For example said first level snapshot or said second level snapshot is taken regularly, e.g. every minute. Said first level snapshot or said second level snapshot may be a table comprising a mapping of individual control elements and their status. An example using signal to noise ratio (SNR) is given in the exemplary table below:

| 1st control element No. | 2nd control element No. | Threshold value SNR | Status SNR |
|---|---|---|---|
| 1 | 2 | +3 dB | +20 dB |
| 1 | 3 | +3 dB | 0 dB |

In the example the first control element number and second control element number are arbitrary but unique identifiers of the individual control elements.

For example the control element having the number 1 is a first level control element 102 that is connected for communication to two second level control elements having the numbers 2 and 3 respectively. The data link used has a threshold value for the signal to noise ratio (SNR) of 3 dB.

Any signal to noise ratio below this value is considered to be a problem for reliable communication between the control elements.

In the example above the signal to noise ratio of the data link between the first level control element number 1 and the second level control element number 2 is 20 dB which is considered good.

In the example above the signal to noise ration of the data link between the first level control element number 1 and the second level control element number 3 is 0 dB which is considered too low.

When signal to noise ratio is monitored, said device is adapted to detect that there is a problem in the communication when the signal to noise ratio currently received from one of the monitoring control elements 102, 103 for a specific data link is lower than the respective threshold value.

According to the example, said first level control element number 1 sends information about the communication with both second level control elements number 2 and 3. Additionally the same information may be received from control elements number 2 or 3. However in the case of communication issues, information from the affected control element, in this case control element number 3, itself may not be available.

Hence in this case said device is adapted to detect the problem in the data link between the control elements number 1 and 3 because of the value 0 dB received is lower than the threshold value 20 dB.

Furthermore said device is adapted to send the command for autonomous control to either one of the affected control elements, in this case control elements number 1 or 3, or both affected control elements, in this case control elements 1 and 3. However in the case of communication issues, information sent to the affected control element, in this case control element number 3, itself may not be received.

In case of said first example, where said control element 102, 103 is adapted to send the command, sending of said command may be a function call or starting of a process on said control element 102, 103 with which said control element 102, 103 sets itself to work autonomously. In this case no message is sent via said data link 104.

In case of dedicated data links between the control elements 102, 103 amongst themselves and said second example additional individual data links between the control elements 102, 103 and said server 101 however, the data link between two of the control elements 102, 103 may be affected but the information may still pass back and forth between control elements 102, 103 and said server 101 without problem.

In case of said second example, said command for autonomous control may be a message send by said server 101 to all or only to the affected control elements. Said command for example comprises information to identify the control element 102, 103 that shall work autonomously, e.g. an internet protocol address or said unique identifier.

In the second example it is assumed that the communication problem is between the control elements number 1 and 3 only. Hence said server 101 is adapted to send the command for autonomous control to said second level control element number 3 because it is on the far end of the power grid. The first level control element number 1 may or may not receive the command in this case, because the first level control element number 1 may be able to operate interacting with the other first level control elements or the second level control element number 2 as long as the respective data links are not affected by the problem.

According to both examples said first level snapshot or said second level snapshot may be used in order to determine rules for working autonomously. Said first level snapshot or said second level snapshot may comprise of more information, e.g. regarding local power grid malfunction, error messages, critical discontinuities, abnormal behaviour, singularities, imbalance of demand and generation of power or issues with power quality.

Said rules are for example determined depending on said snapshot from predefined rules, depending on the situation at hand. For example a rule for each affected control element 102, 103 is determined.

In the example of signal to noise ratio said predetermined rules define for each element a default action that is to be taken when the signal to noise ratio drops below the threshold value. For example for first and second level control elements the default actions are given in the table below.

In the context of the following table, regional control refers to control wherein information exchange between the regional or first level control elements 102 is used. Likewise local control refers to control wherein exchange between the neighbouring or second level control elements 103 is used. No regional or no local control refers to control wherein the control elements affected don't use information from communication with other first level control elements or second level control elements.

| Addressee | Problem | Action |
| --- | --- | --- |
| First level control element number 1 | SNR for data link to first and second level control element on or above threshold | Regional control Local control |
| First level control element | SNR for data link to first and second level control element below threshold | No Regional control No Local control |
| First level control element | SNR for data link to first level control element below threshold, to second level on or above target | No Regional control Local control |
| First level control element | SNR for data link to first level control element on or above threshold, to second level control element below threshold | Regional control No Local control |
| Second level control element | SNR for data link to first and second level control element on or above threshold | Regional control Local control |
| Second level control element | SNR for data link to first and second level control element below threshold | No Regional control No Local control |
| Second level control element | SNR for data link to first level control element below threshold, to second level on or above target | No Regional control Local control |
| Second level control element | SNR for data link to first level control element on or above threshold, to second level control element below threshold | Regional control No Local control |

In the example, said second level control element number 2 and said first level control element 1 are not affected. Hence said predetermined rule "Regional control. Local control" is selected from the table above and sent to said first level control element 1 and said second level control element 2.

Furthermore in the example, said second level control element number 3 and said first level control element 1 are affected. Hence said predetermined rule "Regional control. No local control" is selected from the table above and sent to said first level control element 1 and said second level control element 3.

Furthermore said device is adapted to arbitrate selected rules contradicting each other when they affect the same control elements. In the example the rule "Regional control. Local control." contradicts the rule "Regional Control. No local control.". For example in any case where a rule comprises "No local control" or "No regional control", the respective rule is used instead of a contradicting "regional control" or "local control" rule.

Hence according to the example, said first level control element number 1 and said second level control element number 2 and 3 receive the same rule "Regional control. No local Control.".

The rules are not limited to the example above. For example in case the data links between the second level control elements number 2 and 3 were monitored separately, an additional rule for example "peer control" or "no peer control" may be used to switch on or of information exchange between said second level control elements number 2 and 3.

Figure 3:
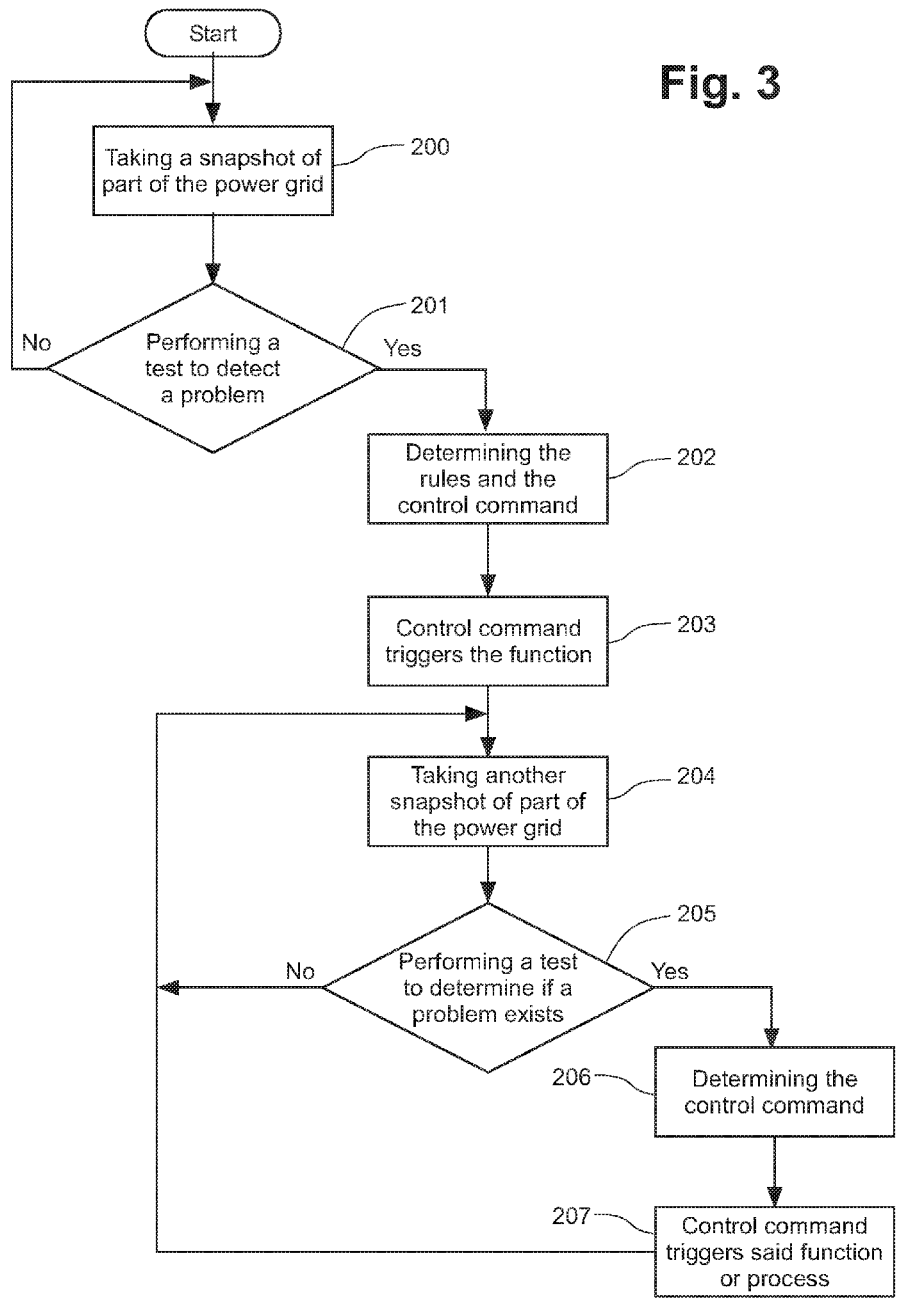
FIG. 3 schematically shows a flow chart.

A method for operating a power grid having decentralized control elements is describe below making reference to FIG. 3. The method according to this example is the same for both examples. Goal of said method is to implement a resistant grid for example in case of communication breakdown, lightning strikes, broken supply network, electromagnetic discharge (EMD), hacker attacks.

Said method for example starts when a user triggers a program implementing said method to start on said server 101.

After the start a step 200 is executed.

In said step 200 said first level snapshot or said second level snapshot of at least a part of said power grid is taken. For example said information received is consolidated into tables and stored on said storage. Afterwards a step 201 is executed.

In said step 201 a test is performed to detect a problem. For example current values of characteristics are compared to the respective threshold values. In the example, said signal to noise ratio is compared to the respective threshold value for each data link between all control elements 102, 103.

In case at least one problem is detected, a step 202 is executed. Otherwise no problem is detected and step 200 is executed to create a new snapshot. A time delay of for example one minute may apply before repeating step 200. This results in regularly snapshots being taken.

In said step 202 said rules and said control command are determined. For example from said first level snapshot or said second level said rule "Regional Control. No local Control." is determined. Individual control commands are determined for each problem detected using said rules. For example a control command for each control element 102, 103 affected by a problem is determined.

For example the control command "Regional Control. No local Control" is determined for said first level control element number 1 and said second level control elements number 2 and 3.

Afterwards a step 203 is executed.

In said step 203 either according to said first example, said control command triggers said function call or process to work autonomously. Or according to said second example sending of said control command to the respective control elements 102, 103 is triggered. The first means that said control element 102, 103 forces itself to work autonomously. The latter means that said server 101 forces the respective control elements 102, 103 to work autonomously by first determining and then sending the appropriate control command. Afterwards a step 204 is executed.

In said step 204 another snapshot is taken as described in step 200.

Afterwards a step 205 is executed.

In said step 205 a test is performed to determine if a new problem exists or at least one of the previously detected problems doesn't exist anymore. Said problem is detected for example as described in said step 201.

In case at least one of said problems doesn't exist anymore, said step 204 is executed. Otherwise a step 206 is executed.

In said step 206 said control command is determined. Said control command is for example determined as described in said step 202. Afterwards a step 207 is executed.

In said step 207 according to said first example said control command triggers said function or process as described in step 203. According to said second example said control command is sent to the affected control elements as described in step 203. Afterwards said step 204 is executed.

Said method ends for example upon a trigger halting the program executing on said server 101.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow chart and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for operating a power grid that has decentralized control elements, comprising:
   adapting the decentralized control elements to interact with each other by communication of information via a data link;
   monitoring, by at least one of the decentralized control elements, at least a part of the power grid, the at least one of the decentralized control elements, or an interaction between the decentralized control elements; and
   when a communication breakdown problem in the monitored at least the part of the power grid, the monitored at least one of the decentralized control elements, or the interaction between the monitored decentralized control elements is detected by the at least one of the decentralized control elements based on measurements of signal and noise ratio strength or the detection of packet loss, the at least one of the decentralized control elements forces itself when affected by the communication breakdown problem to work autonomously.

2. The method according to claim 1, wherein the at least one of the decentralized control elements forces itself to work autonomously based on a last of a series of snapshots of an overall situation of the power grid taken regularly by a server or the at least one of the decentralized control elements while monitoring, and wherein the last of the series of snapshots comprises:
- a status of the at least the part of the power grid,
- a state of the at least one of the decentralized control elements, or
- the interaction between the decentralized control elements taken at an instance or before the communication breakdown problem occurs, wherein one or more rules for operating the affected at least one of the decentralized control elements are determined from the last of the series of the snapshots.

3. The method according to claim 1, wherein the monitored at least one of the decentralized control elements forces itself to work autonomously based on a predefined rule, and wherein the predefined rule is determined from a set of predefined rules to overcome the communication breakdown problem and to guarantee an optimal power quality within the power grid.

4. The method according to claim 1, wherein the power grid is structured hierarchically in power grid levels with a regional higher level and a neighboring lower level, and wherein the decentralized control elements are adapted to interact with neighboring decentralized control elements of a same power grid level and of a next higher or lower power grid level.

5. The method according to claim 1, wherein the measurements of the signal and noise ratio strength or the detection of the packet loss are performed by the at least one of the decentralized control elements.

6. The method according to claim 1, wherein the at least one of the decentralized control elements is adapted to detect the communication breakdown problem depending on a result of comparing a target value of a characteristic value with a threshold value.

7. The method according to claim 6, wherein the characteristic value comprises a voltage threshold acceptable for operation of said power grid.

8. The method according to claim 1, wherein the at least one of the decentralized control elements affected by the communication breakdown problem forces itself to work autonomously by executing a command via a function call or a start of a process.

9. A system for operating a power grid, comprising:
decentralized control elements adapted to interact with each other by communication of information via a data link, wherein at least one of the decentralized control elements is adapted to
- monitor at least a part of the power grid, the at least one of the decentralized control elements or an interaction between the decentralized control elements,
- detect, via measurements of signal and noise ratio strength or the detection of packet loss, a communication breakdown problem in the monitored at least the part of the power grid, the monitored at least one of the decentralized control elements or the interaction between the monitored decentralized control elements, and
- force itself to work autonomously when affected by the detected communication breakdown problem.

10. A decentralized control element for operating a power grid adapted to
- control at least a part of the power grid based on an interaction with at least one other decentralized control element by communication of information via a data link,
- monitor the at least part of the power grid, the at least one other decentralized control element or the interaction between itself and the at least one other decentralized control element,
- detect a communication breakdown problem in the at least part of the power grid, the at least one other decentralized control element or the interaction between itself and the at least one other decentralized control element based on measurements of signal and noise ratio strength or the detection of packet loss, and
- force itself to work autonomously when affected by the detected communication breakdown problem.

11. A non-transitory computer-readable storage medium having computer readable instructions encoded therein, said computer readable instructions adapted to be executed by a computer comprising a processor and a memory to implement the method of claim 1.

* * * * *